United States Patent [19]

Taniguchi

[11] Patent Number: 5,179,974
[45] Date of Patent: Jan. 19, 1993

[54] VALVE OPEN-CLOSE INDICATING APPARATUS

[75] Inventor: Tsutomu Taniguchi, Yokohama, Japan

[73] Assignee: Fuji Seiki Inc., Kanagawa, Japan

[21] Appl. No.: 926,529

[22] Filed: Aug. 5, 1992

[30] Foreign Application Priority Data

Aug. 6, 1991 [JP] Japan ................. 3-196866

[51] Int. Cl.⁵ ............................... F16K 37/00
[52] U.S. Cl. ...................... 137/554; 251/58; 116/277
[58] Field of Search ............... 137/554, 553; 251/62, 251/58; 116/277

[56] References Cited

U.S. PATENT DOCUMENTS

| | | | |
|---|---|---|---|
| 2,709,451 | 5/1955 | La Bour | 251/58 |
| 3,207,468 | 9/1965 | Lauducci et al. | 251/58 |
| 3,367,365 | 2/1968 | Stevens | 251/58 |

Primary Examiner—A. Michael Chambers
Attorney, Agent, or Firm—Webb, Burden, Ziesenheim & Webb

[57] ABSTRACT

A valve open-close indicating apparatus comprises a cylindrical housing having two opposite ends in the axial direction thereof, a sleeve arranged in the housing for axial reciprocation between the opposite ends of the housing, and a cylindrical elastic member for urging the sleeve from both outer sides with respect to the axial direction so that the sleeve is normally situated in an intermediate position between the opposite ends. When a piston moves toward one end of the housing to open a valve, the sleeve is pressed toward the one end against the urging force of the cylindrical elastic member, and the indicating apparatus indicates "open." When the piston moves toward the other end to close the valve, the sleeve is pressed toward the other end against the urging force, and the indicating apparatus indicates "closed." When the piston is situated between the opposite ends, the sleeve is restored to the intermediate position by means of the cylindrial elastic member without being pressed by the piston, and the indicating apparatus indicates nothing. The sleeve is normally restored to the intermediate position by means of the cylindrical elastic member, and is moved as required, toward either of the opposite ends by means of the piston.

4 Claims, 7 Drawing Sheets

VALVE OPEN-CLOSE INDICATING APPARATUS

BACKGROUND OF THE INVENTION

1. Field of the Invention

The present invention relates to a valve open-close indicating apparatus for indicating an open or closed state of a valve, such as a gate valve, butterfly valve, etc.

2. Description of the Related Art

In a valve, such as a gate valve or butterfly valve, a piston is reciprocated by means of pneumatic pressure, hydraulic pressure, etc., and a valve plug is reciprocated with respect to a valve seat, whereby the valve is opened and closed.

The valve of this type is provided with an open-close indicating apparatus for indicating the current state of the valve, open or closed. Thus, an operator can confirm the open or closed state of the valve, and therefore, can be prevented from wrongly operating the valve. To attain this, the open or closed state of the valve must be indicated correctly, so that the indicating apparatus requires high reliability.

The conventional open-close indicating apparatus is provided with, for example, a limit switch which is turned on and off as the piston reciprocates. In response to this on-off operation, the indicating apparatus indicates "open" or "closed."

On rare occasions, however, the limit switch of the conventional indicating apparatus cannot be shifted following the reciprocation of the piston. In such cases, therefore, the indicating apparatus may undergo wrong operation, so that its reliability is not satisfactory.

Further, maintenance work sometimes requires the valve to be disassembled. Accordingly, the indicating apparatus, as well as the valve, is expected to have a simple structure and be easy to assemble.

SUMMARY OF THE INVENTION

The object of the present invention is to provide a valve open-close indicating apparatus enjoying various advantages, such as very little possibility of wrong operation, high reliability, simple structure, and ease of assembling.

According to the resent invention, there is provided a valve open-close indicating apparatus for indicating an open or closed state of a valve, comprising: a cylindrical housing having two opposite ends in the axial direction thereof; a sleeve arranged in the housing for axial reciprocation between the opposite ends of the housing; urging means for urging the sleeve from both outer sides with respect to the axial direction so that the sleeve is normally situated in an intermediate position between the opposite ends; a piston arranged in the sleeve for axial reciprocation between the opposite ends of the housing, the piston being adapted to reciprocate between the opposite ends of the housing, thereby opening and closing the valve, so that the sleeve is pressed toward one end of the housing against the urging force of the urging means when the piston moves toward the one end to open the valve, and that the sleeve is pressed toward the other end against the urging force when the piston moves toward the other end to close the valve; and indicate means adapted to indicate "open" when the sleeve is pressed toward the one end, indicate "closed" when the sleeve is pressed toward the other end, and display no indication when the sleeve is restored to the intermediate position by means of the urging means without being pressed by the piston.

Thus, when the piston moves toward the one end of the housing to open the valve, the sleeve is pressed toward the one end against the urging force, and the indicate means indicates "open" when the piston moves toward the other end to close the valve, the sleeve is pressed toward the other end against the urging force, and the indicate means indicates "closed." When the piston is situated between the opposite ends, the sleeve is restored to the intermediate position by the urging means without being pressed by the piston, and the indicate means displays no indications.

The sleeve is normally restored to the intermediate position by the urging means, and is moved, as required, toward either of the opposite ends by means of the piston. Accordingly, the sleeve cannot move unexpectedly, and never fails to be moved when necessary. Following the reciprocation of the piston, therefore, the sleeve can move securely, so that the indicating apparatus can indicate "open" or "closed" without fail. Thus, the possibility of wrong operation of the indicating apparatus is so little that the mechanism can enjoy high reliability. Including a relatively small number of components, moreover, the indicating apparatus has a simple structure, and is easy to assemble.

DETAILED DESCRIPTION

FIGS. 1 to 8 show a gate valve as a vacuum valve which is used to keep one side of a flow tube (not shown) under vacuum.

This gate valve comprises a valve body 10 for opening and closing the flow tube and a valve open-close drive mechanism 30 according to an embodiment of the present invention for driving the valve body 10.

Figure 2:
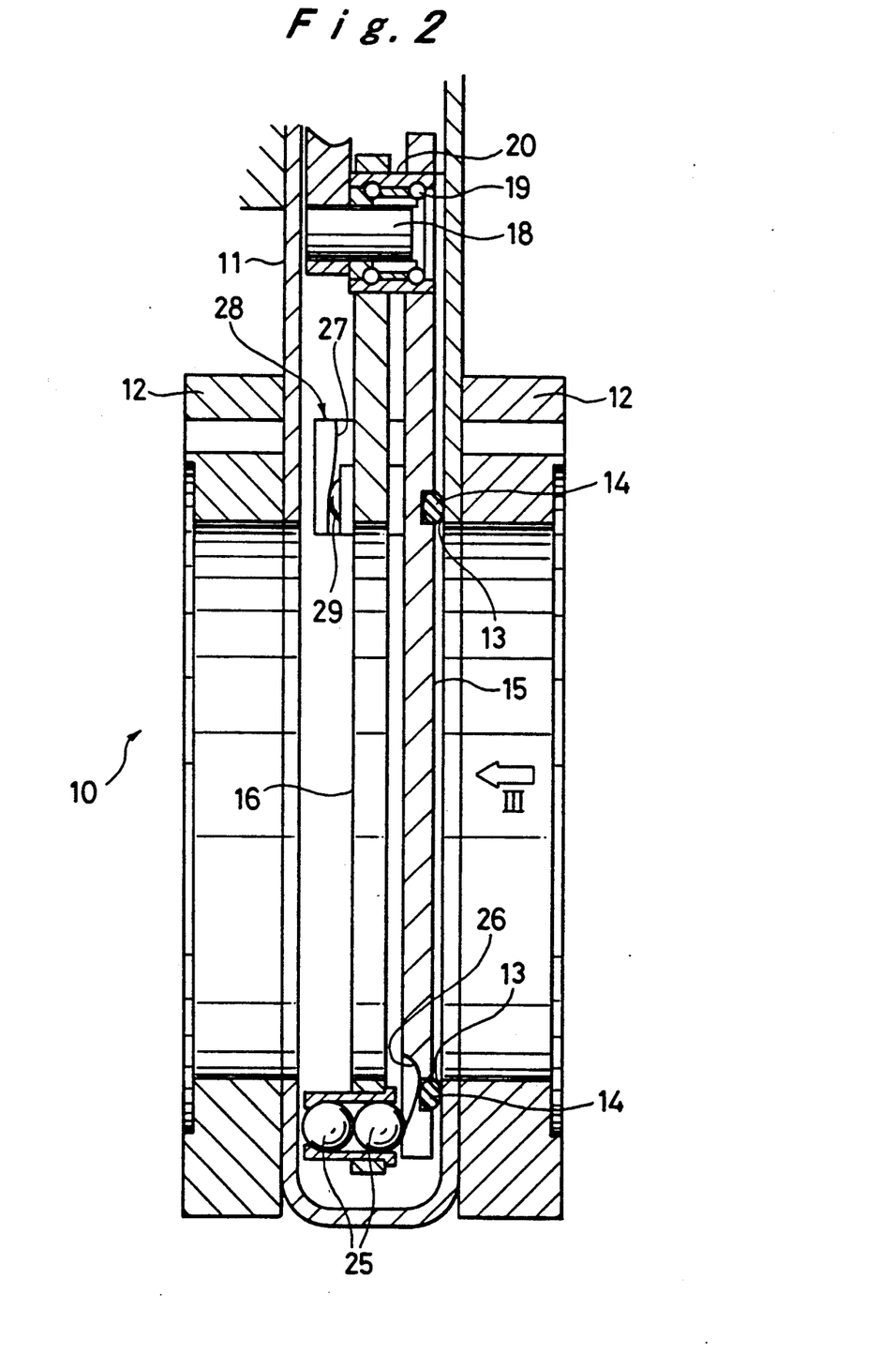
FIG. 2 is a sectional view of a valve plug with the valve of FIG. 1 closed.
Figure 3:
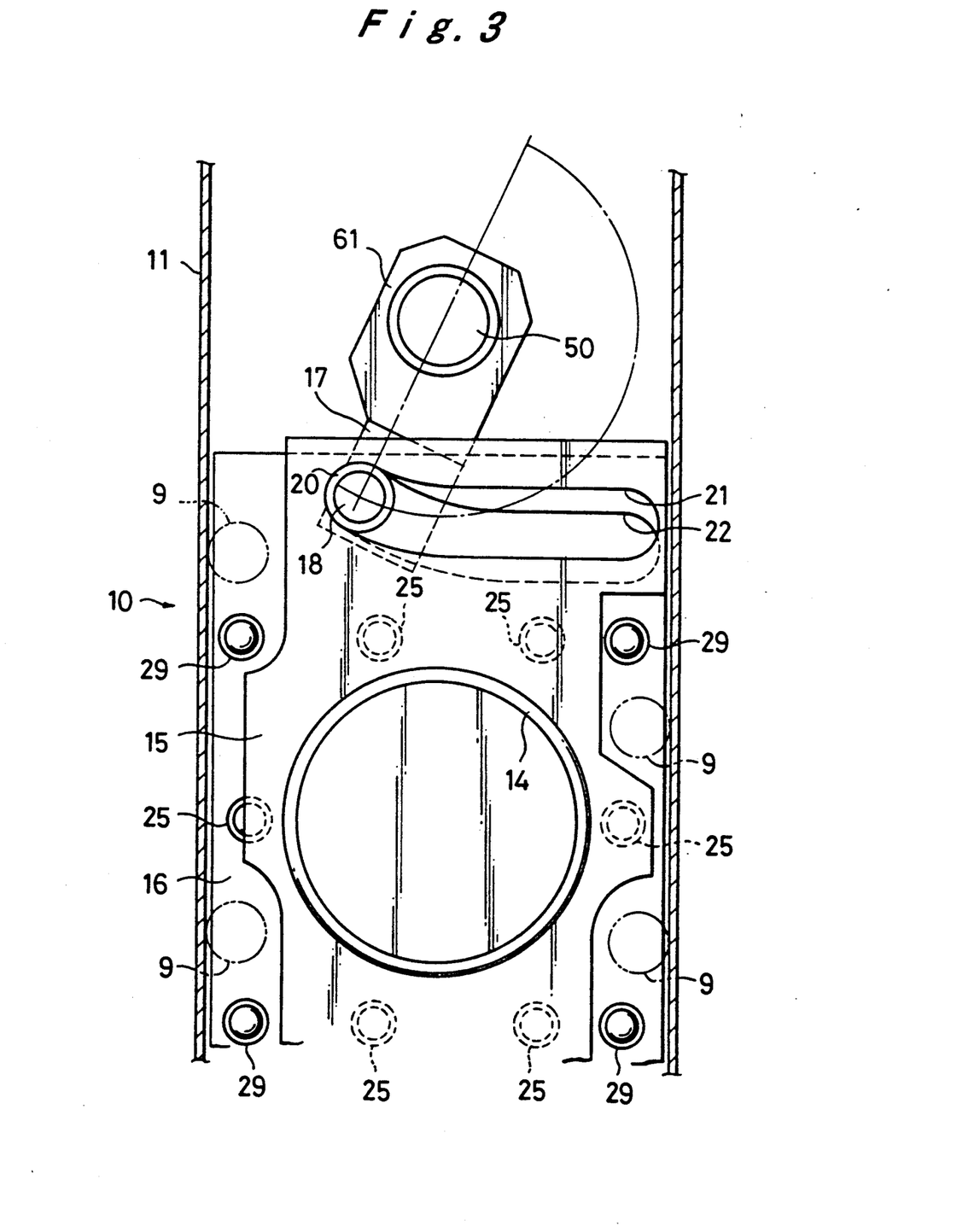
FIG. 3 is a fragmentary view in the direction of arrow III in FIG. 2.
Figure 4:
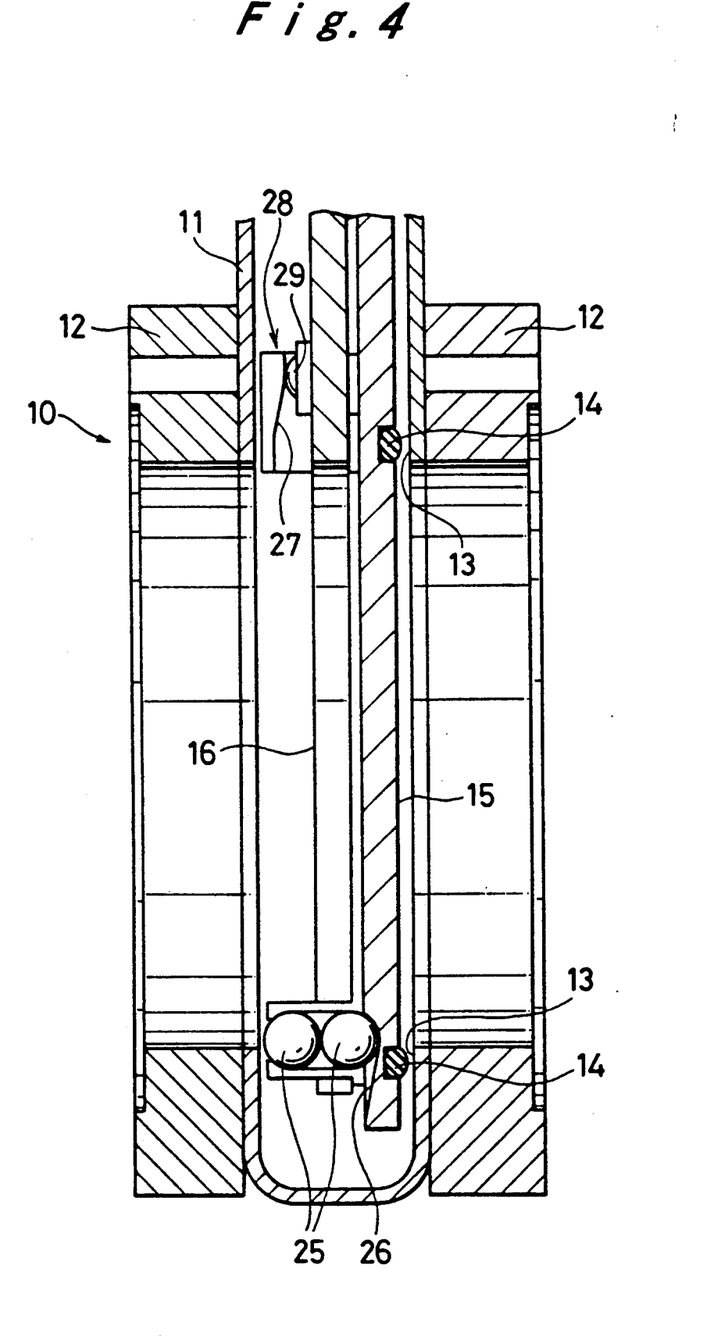
FIG. 4 is a sectional view of the valve plug in a state immediately after the valve shown in FIG. 1 is opened.

Referring first to FIGS. 2 to 4, the structure of the valve body 10 will be described. FIG. 2 shows a closed state of the valve, FIG. 3 is a fragmentary view in the direction of arrow III in FIG. 2, and FIG. 4 shows a state immediately after the valve is opened.

The valve body 10 is provided with a housing 11 in the form of an envelope, and a pair of flow tube connecting flanges 12 are fixed individually to the outer both sides of the housing 11 in a symmetrical manner. The housing 11 and the flanges 12 are formed individually having openings for the flow of a fluid. A valve seat 13 is defined by that portion of the side wall of the housing 11 which is situated closer to one opening. A valve plug 15 is provided for up-and-down motion in the housing 11. A seal member 14, which is inlaid in the valve plug 15, engages the valve seat 13, thereby closing the valve.

The valve plug 15 is moved between a down position (valve closing position) and an up position (valve opening position) by means of a lock mechanism described below.

The lock mechanism is provided with a guide plate 16 arranged parallel to the valve plug 15. As shown in FIG. 3, the valve plug 15 and the guide plate 16 are vertically guided along the inner wall of the housing 11 by means of a plurality of guide roller 9. As shown in FIGS. 2 and 3, the respective upper portions of the plug 15 and the plate 16 are supported by means of an arm 17 of the valve open-close drive mechanism 30. More specifically, a fixed shaft 18 is fixed to the arm 17, and a roller 20 is rotatably mounted on the fixed shaft 18 by means of a bearing 19. As shown in FIG. 3, the roller 20 slides in two guide slots 21 and 22 which are formed in the valve plug 15 and the guide plate 16, respectively. Thus, when the arm 17 is rotated, the roller 20 is guided by the guide slots 21 and 22, so that the valve plug 15 and the guide plate 16 are vertically moved in the housing 11.

As shown in FIG. 3, moreover, the guide slots 21 and 22 are at the same height on their left-hand end side, while the right-hand end of the slot 21 is situated higher than that of the slot 22. Thus, when the roller 20 reaches the respective left-hand ends of the guide slots 21 and 22, the valve plug 15 and the guide plate 16 are situated on the same height level (state shown in FIGS. 2 and 3). In this state, both of the plug 15 and the plate 16 take their down position (valve closing position). When the roller 20 moves to the right-hand side where the guide slots 21 and 22 are on different levels, the guide plate 16 immediately begins to take higher position than that of the valve plug 15, while the plug 15 mantans the down position for a time (state shown in FIG. 4). In this state, the plug 15 and the plate 16 take their intermediate positions between valve closing position and valve opening position.

Until the point of time immediately before the valve is closed, therefore, the roller 20 is situated in a position such that the guide slots 21 and 22 are on different levels, and the guide plate 16 is situated higher than the valve plug 15, as shown in FIG. 4. If the valve plug 15 is urged to take its fully-closing position (down position), as shown in FIG. 2, however, the roller 20 is guided from different-level portions of the guide slots 21 and 22 to the same-level portions thereof (left-hand ends f the slots 21 and 22 in FIG. 3). As a result, the guide plate 16 is pushed down with respect to the valve plug 15, whereupon the plug 15 and the plate 16 are stopped at the position where they are on the same level. If the valve plug 15 starts to move from the aforesaid fully-closing position (down position)toward its opening position (up position), on the other hand, the roller 20 is guided to the same-level portions of the guide slots 21 and 22 to different-level positions thereof. As a result, the guide plate 16 is pushed up relatively to the valve plug 15, whereupon the plate 16 is situated higher than the plug 15.

If the valve plug 15 is urged to take its opening position (up position), moreover, it is operated in the same manner as in the case where it is urged to take the closing position (down position).

When the valve plug 15 and the guide plate 16 then approach the valve closing position, the lock mechanism causes the plug 15 to move toward the valve seat 13. When the plug 15 and the plate 16 start to move toward the valve opening position, on the other hand, the lock mechanism causes the plug 15 to be separated from the seat 13 and approach the plate 16.

More specifically, as shown in FIGS. 2 and 4, a pair of balls 25 are arranged at the lower portion of the guide plate 16 so that they are urged toward the plug 15, and guide grooves 26 are formed in the lower portion of the plug 15. The balls 25 are adapted to slide in the grooves 26. Each guide groove 26 gets deeper with distance from its lower end. As shown in FIG. 3, the balls 25 and the guide grooves 26 are arranged in a plurality of positions.

Thus, when the balls 25, fitted in the guide grooves 26, are moved downward in the housing 11 to reach positions such that the valve plug 15 face the valve seat 13, as shown in FIG. 4, the guide plate 16 is moved further downward, as mentioned before. Thereupon, the balls 25 slide downward in the guide grooves 26, so that the valve plug 15 is moved so as to be separated from the guide plate 16 and approach the seat 13. As a result, the valve plug 15 is pressed against the valve seat 13 and locked. Thus, the valve is closed.

As shown in FIGS. 2 and 4, on the other hand, the valve plug 15 is provided with a projection plate 28 which has guide cams 27, and the guide plate 16 is provided with balls 29 which slide along the cams 27. The balls 29, which are designed in the same manner as the aforesaid balls 25, are urged toward the cams 27. Each guide cam 27 is designed so that it gets closer to the plug 15 and the plate 16 with distance from its lower end. As shown in FIG. 3, the balls 29 and the guide cams 27 are arranged in a plurality of positions.

Thus, when the valve plug 15 and the guide plate 16 start to move from the closing position (down position) toward opening position (up position), the plate 16 is pushed up with respect to the plug 15, and the balls 29 slide upward along the guide cams 27. As a result, the valve plug 15 is separated from the valve seat 13 and moves toward the guide plate 16, whereupon it is locked.

According to this lock mechanism, the valve is opened and closed with the guide plate 16 or any other member not in contact with the bottom wall of the housing 11 or the like, so that the sound of the valve closing operation is soft. Further, the valve is opened and closed by continuously moving the valve plug 15 and the guide plate 16 by means of the arm 17, without requiring use of any stoppers for the plug 15 and the plate 16. Accordingly, the valve plug and the guide plate can be smoothly moved without knocking. Furthermore, the lock mechanism has a very simple structure, and can be easily taken out of the housing 11, so that its maintenance is very easy.

Figure 1:
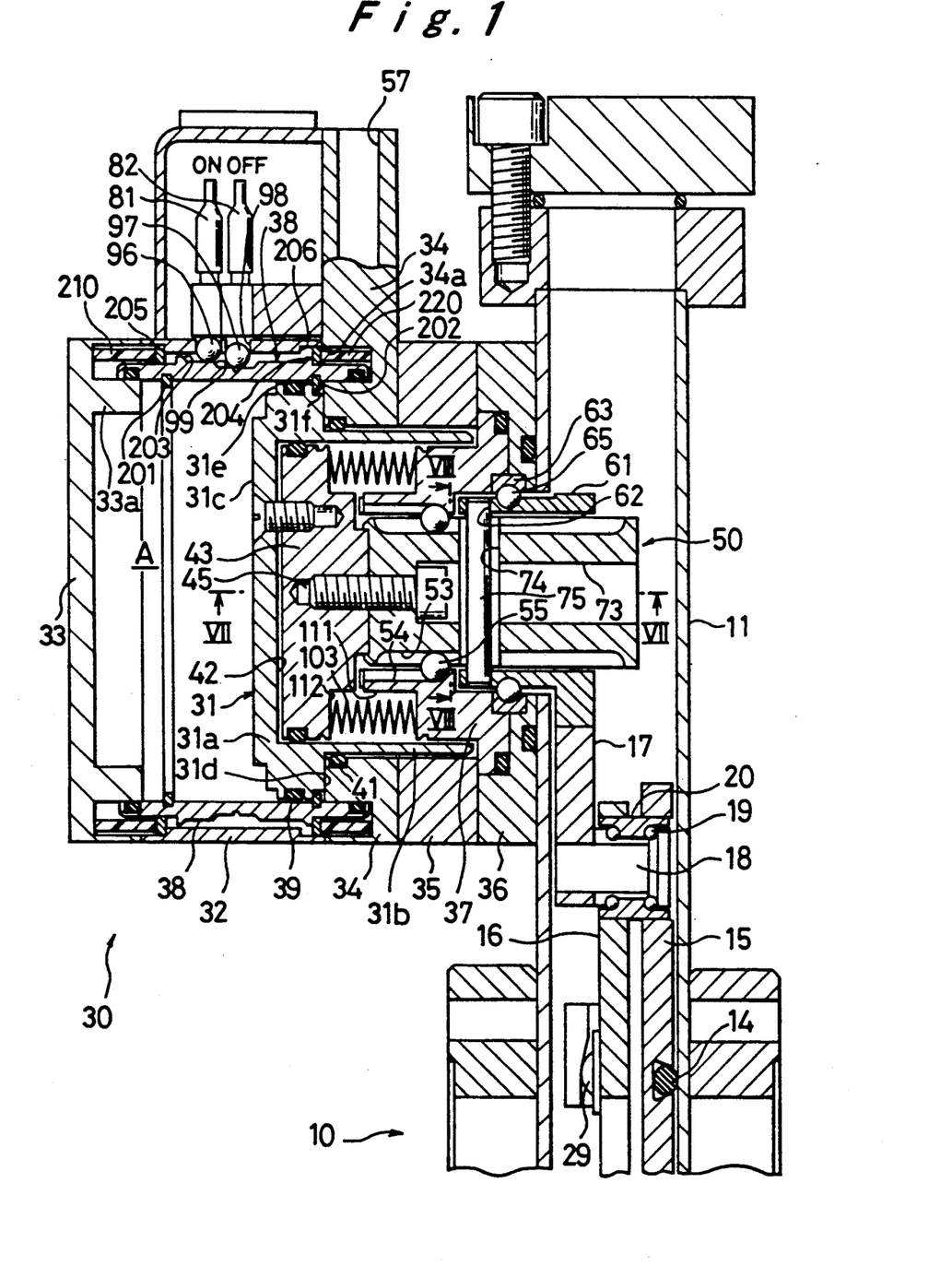
FIG. 1 is a sectional view of a valve open-close drive mechanism according to an embodiment of the present invention, with a valve closed.
Figure 5:
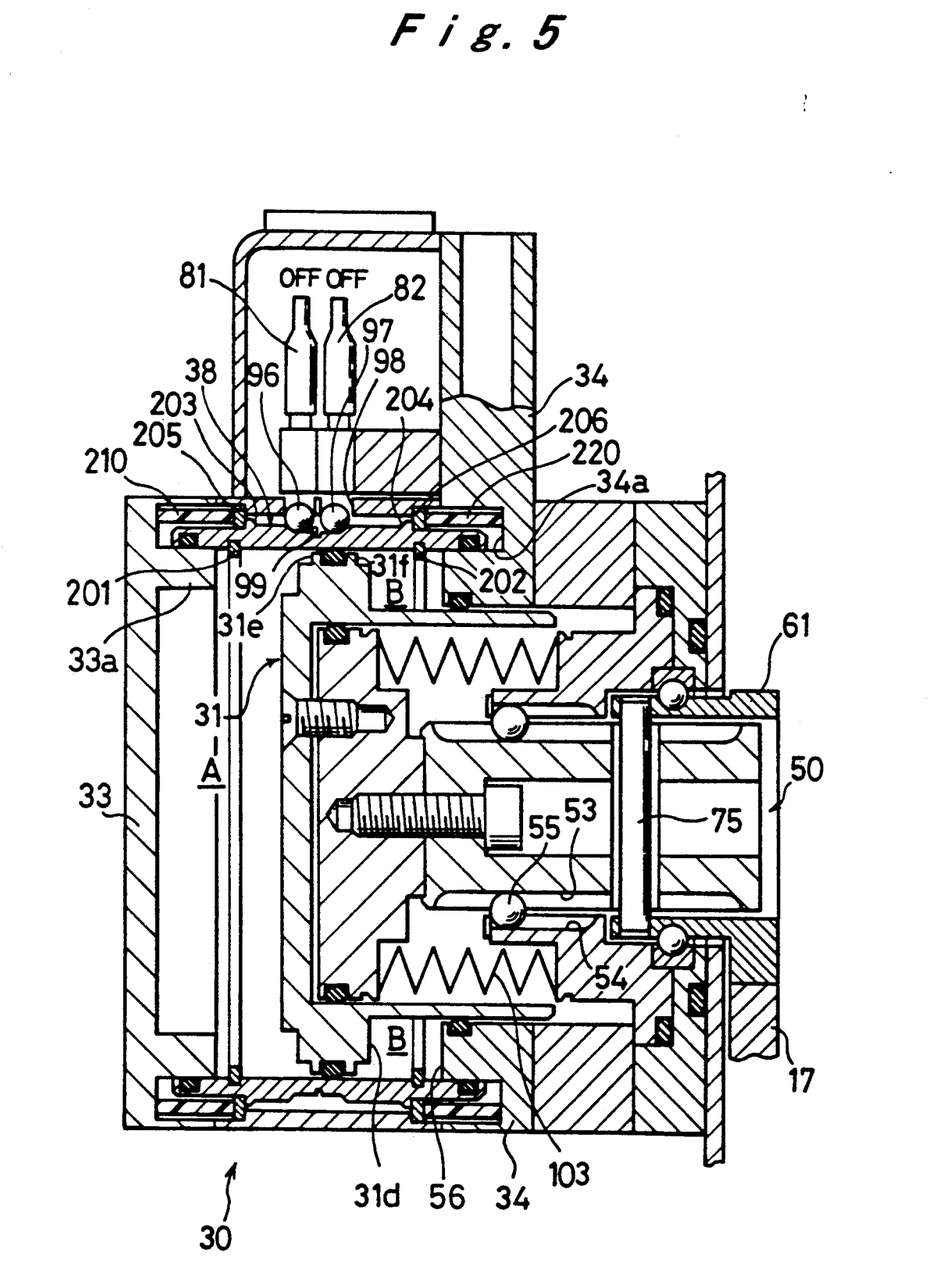
FIG. 5 is a sectional view of the valve open-close drive mechanism shown in FIG. 1, with a piston in its intermediate position.
Figure 6:
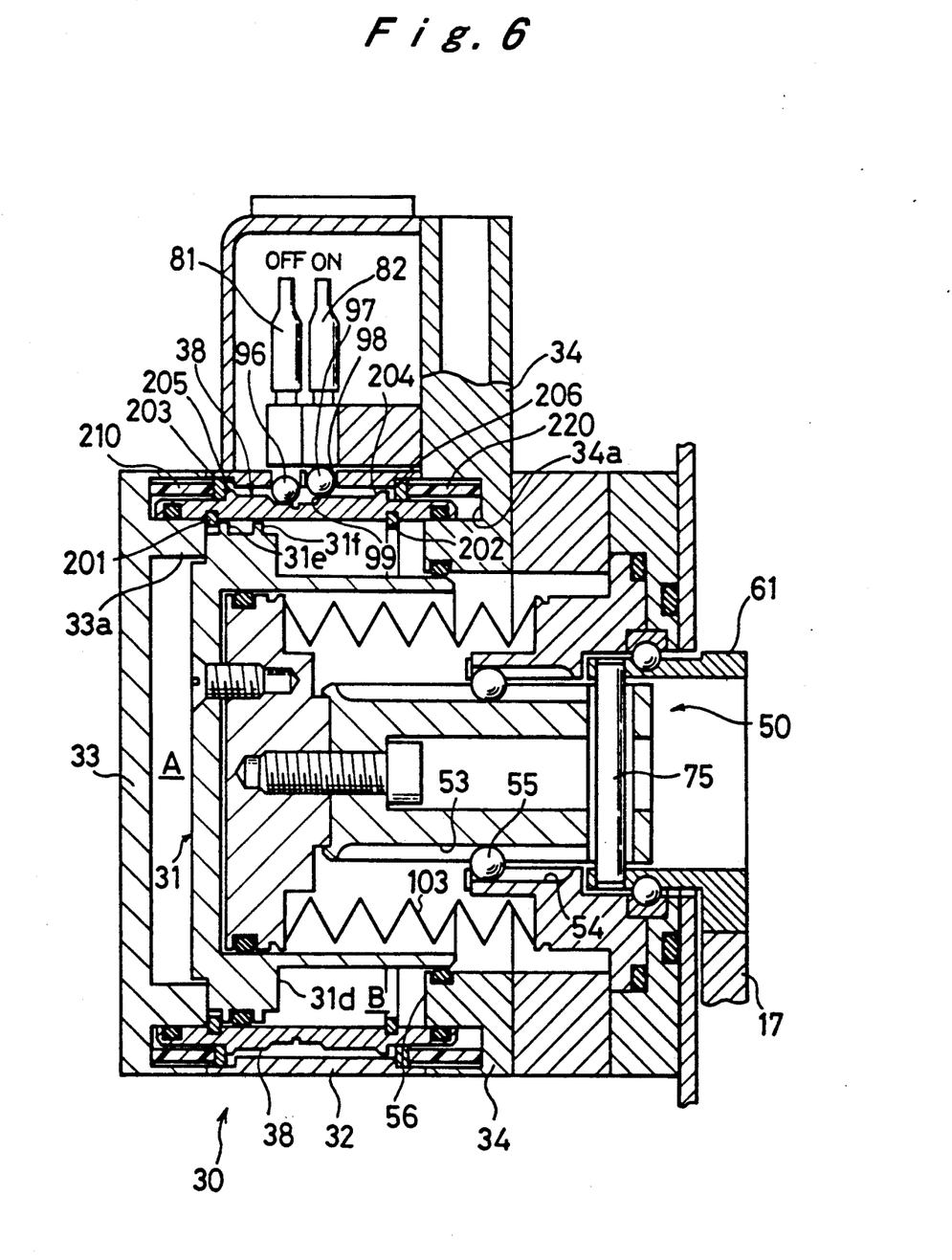
FIG. 6 is a sectional view of the valve open-close drive mechanism with the valve of FIG. 1 open.
Figure 7:
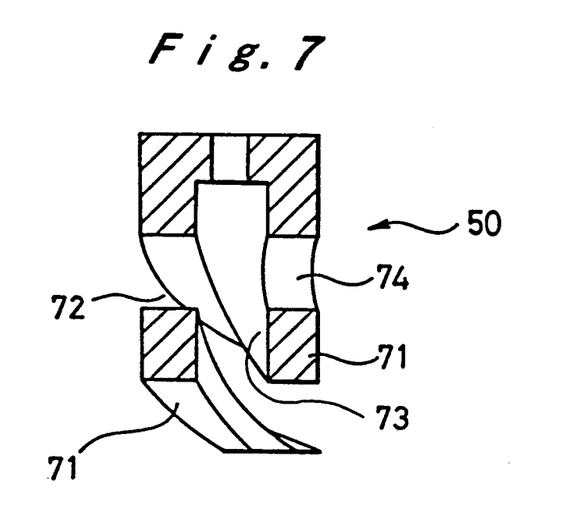
FIG. 7 is a sectional view of a screw taken along line VII—VII of FIG. 1.
Figure 8:
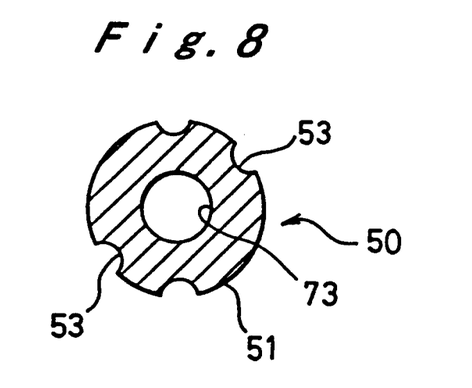
FIG. 8 is a sectional view of the screw taken along line VIII—VIII of FIG. 1.

Referring now to FIGS. 1, 5, 6, 7 and 8, the valve open-close drive mechanism 30 according to the present embodiment will be described. FIG. 1 is a sectional view of the open-close drive mechanism with the valve closed, FIG. 5 is a sectional view of the drive mechanism with a piston in its intermediate position, FIG. 6 is a sectional view of the drive mechanism with the valve open, FIG. 7 is a sectional view of a screw taken along line VII—VII of FIG. 1, and FIG. 8 is a sectional view of the screw taken along line VIII—VIII of FIG. 1.

Basically, in the valve open-close drive mechanism 30, as shown in FIG. 1, the piston 31 is linearly moved by means of pneumatic pressure, and the screw 50 is subjected to a linear motion by means of the piston 31. The linear motion of the screw 50 is converted into a rotatory motion of a pivot 75, whereby the arm 17 is rotated, so that the valve is opened and closed in the aforementioned manner.

First, a mechanism for subjecting the piston 31 to a linear motion will be described.

A housing of this drive mechanism comprises a cylinder 32, a cover member 33 closing the left-hand end of the cylinder 32, a first cylindrical block 34 arranged on the right of the cylinder 32, a second cylindrical block 35 fixed to the right-hand side of the first block 34, a third cylindrical block 36 fixed to the right-hand side of the second block 35, and a cylindrical stationary member 37 arranged in the second and third blocks 35 and 36.

On the other hand, a sleeve 38 is slidably mounted in the cylinder 32, and the piston 31 is arranged in the sleeve 38 for sliding motion. The piston 31 is composed of a large-diameter portion 31a, which is slidable in the sleeve 38, and a small-diameter portion 31b in the form of a hollow cylinder, which is smaller in diameter than the portion 31a. The small-diameter portion 31b is slidable inside the first block 34 and between the second block 35 and the cylindrical stationary member 37. The space between the large-diameter portion 31a and the sleeve 38 is sealed by means of an O-ring 39, and the space between the small-diameter portion 31b and the first block 34 by means of an O-ring 41.

A piston block 43 for setting a bellows 103 (mentioned later) is fixed to the bottom portion of a bottomed hole 42 in the piston 31, and the screw 50 is fixed to the block 43 by means of a bolt 45. The screw 50 is fitted in the cylindrical stationary member 37 so as to be axially movable and non-rotatable. More specifically, several axially extending groves 53 are formed on the outer peripheral surface of the screw 50 (see FIG. 8). Also, several axially extending grooves 54 are formed on the inner peripheral surface of the stationary member 37 which face the grooves 53 on a base portion 51 of the screw 50. Several balls 55 are fitted in these grooves 53 and 54. The grooves and the balls constitute a slide bearing, which enables the screw 50 to move smoothly in the axial direction without being allowed to rotate. Thus, when the piston 31 is moved in the axial direction, the piston block 43 and the screw 50 are moved integrally with the piston 31.

Then, the piston 31 is axially moved by means of pneumatic pressure in the following manner.

A first cylinder chamber A is defined by a left-hand end face 31c of the base portion 31a of the piston 31, the sleeve 38, and the cover member 33, while a second cylinder chamber B (see FIGS. 5 and 6) is defined by an annular left-hand end face 56 in the first block 34 and an annular right-hand end face 31d of the base portion 31a of the piston 31. The left- and right-end faces 31c and 31d of the piston 31 are circular and annular, respectively, in shape. Therefore, the pressurization area of the left-hand end face 31c of the piston 31 is wider than that of the right-hand end face 31d.

The way of applying pressure to the first cylinder chamber A is switched between two modes by means of a three-way valve (not shown). In one mode, a constant pressure P (usually, about 4 kgf/cm²) is applied to the chamber A via an air pipe (not shown). In the other mode, atmospheric pressure is applied to the chamber A. On the other hand, the same constant pressure P as that for the first cylinder chamber A is continually applied to the second cylinder chamber B via an air pipe 57 which is formed in the first block 34.

When the three-way valve (not shown) is shifted so that the constant pressure P is applied to the first cylinder chamber A, therefore, the constant pressure P is continually applied also to the second cylinder chamber B. Since the pressurization area of the left-hand end face 31c of the piston 31 is wider than that of the right-hand end face 31c of the piston 31 is wider than that of the right-hand end face 31d, however, a force acting on the face 31c is greater than one on the face 31d. Accordingly, the piston 31 is moved to the right (from a valve-open state to a valve-closed state, i.e., from the state of FIG. 6 to FIG. 1 via FIG. 5), and the valve plug 15 is moved so that the valve is closed, as mentioned later. When the piston 31 is thus moved to the right so that the right-end face 31d of the piston 31 abuts against the first block 34, the movement of the piston 31 is stopped, whereupon the valve is fully closed. In the description herein, the position in the housing where the piston 31 is situated when the valve is closed is referred to as a close-side end portion (state of FIG. 1).

In the present embodiment, the second cylinder chamber B is under the constant pressure P when the piston 31 ceases to move in the aforesaid manner. Therefore, the piston 31 can gently stop, gradually reducing its moving speed. In other words, the second cylinder chamber B is not under vacuum at this point of time, so that no force acts so as to pull the piston 31 toward the first block 34. On the contrary, air in the second cylinder chamber B serves as a cushion, so that the piston 31 slowly moves and gently abuts against the first block 34 without producing a crashing sound. Accordingly, the valve plug 15 also slowly moves, and can gently engage the valve seat 13 without producing a crashing sound. Thus, the valve can be closed very smoothly, and the valve open-close drive mechanism can enjoy a prolonged life.

When the three-way valve (not shown) is reversely shifted so that the atmospheric pressure is applied to the first cylinder chamber A, on the other hand, the force acting on the right-hand end face 31d becomes greater than the force on the left-hand end face 31c, since the constant pressure P, which is higher than the atmospheric pressure, is continually applied to the second cylinder chamber B. Accordingly, the piston 31 is moved to the left (from the valve-closed state to the valve-open state, i.e., from the state of FIG. 1 to FIG. 6 via FIG. 5), and the valve plug 15 is moved so that the valve is opened, as mentioned later. When the piston 31 is thus moved to the left so that the left-end face 31c of the piston 31 abuts against the right-hand end face of the cover member 33, the movement of the piston 31 is stopped, whereupon the valve is fully opened. In the description herein, the position in the housing where the piston 31 is situated when the valve is open is referred to as an open-side end portion (state of FIG. 6).

Since the first cylinder chamber A is under the atmospheric pressure when the piston 31 ceases to move, as in the case of the valve closing operating, air in the chamber A serves as a cushion, so that the piston 31 slowly moves and gently abuts against the right-hand end face of the cover member 33 without producing a crashing sound. Accordingly, the valve plug 15 can gently stop at its valve opening position. As described before, therefore, the valve can be opened and closed very smoothly, so that the properties of the valve plug and the like can be restrained from being worsened. Thus, the valve open-close drive mechanism can enjoy a prolonged life.

According to the present invention, moreover, the fluid pressure to be supplied to the first cylinder chamber A can be switched by means of the three-way valve, so that the structure of a fluid pressure control mechanism can be simplified.

The following is a description of a mechanism for converting the linear motion of the piston 31 into a rotatory motion.

This mechanism is provided with a cylindrical rotating member 61 which is connected to the arm 17 for moving the valve plug 15. Several balls 65 are arranged between the outer peripheral surface of the rotating member 61 and a bush 63. Thus, the rotating member 61 is supported in the third block 36 and the cylindrical stationary member 37 so as to be rotatable and axially immovable.

The screw 50, which is fitted in the cylindrical stationary member 37 for axial movement by means of the balls 55, is also fitted in the cylindrical rotating member 61 for axial movement. The screw 50, as is also shown in FIG. 7, is formed with a pair of spiral claws 71 which project in the axial direction with a pair of gaps 72 of a predetermined size between them. A hole 73 is bored axially through the screw 50. The pivot 75 (mentioned later) can be inserted between the paired gaps 72 through the hole 73. The bolt 45 is inserted in the left-hand portion of the hole 73 so that the screw 50 is fixed to the piston block 43. As shown in FIG. 7, moreover, a hole 74 continuous with the gaps 72 between the claws 71 is formed extending at right angles to the hole 73.

The columnar pivot 75 is inserted in the gaps 72 between the claws 71 and the hole 74 so as to extend substantially at right angles to the axis of the screw 50 and penetrate the hole 74. Each end portion of pivot 75 is inserted in a hole 62 in the cylindrical rotating member 61 so as to be rotatable integrally with the member 61 but immovable in the axial direction.

Thus, when the piston 31 is reciprocated in the axial direction, the screw 50 is reciprocated integrally with the piston 31 in the axial direction. In response to this, the pivot 75 slides along the spiral claws 71 and spirally move in the gaps 72 between the claws 71 through relative rotation. Thus, the cylindrical rotating member 61 is rotated integrally with the pivot 75. As a result, the arm 17, which is connected to the rotating member 61, is rotated to move the valve plug 15 and the guide plate 16, so that the valve is opened or closed.

While the axial linear motion of the screw 50 is converted into the rotatory motion of the pivot 75, the pivot 75 slides along the claws 71, so that the pivot 75 and the claws 71 are in linear contact, not plane contact, as it were. Accordingly, no substantial frictional force is produced between the pivot 75 and the claws 71. When a force in the axial direction is converted into a torque to be transmitted to the pivot 75, therefore, there is hardly any possibility of friction involving a loss, so that the efficiency of conversion to torque can be considerably improved. In contrast with the conventional case, therefore, a great force can be converted into a torque without using a large-sized mechanism, that is, by means of a small mechanism. Since the conversion efficiency is thus made much higher than in the conventional case, moreover, it is unnecessary to compensate for a loss attributable to conversion, and an unreasonably great force need not be applied to the axial movement means.

The gaps 72 between the claws 71 of the screw 50 are formed having the predetermined uniform size, and the pivot 75 and the claws 71 are in linear contact with one another, as mentioned before. While the pivot 75 slides along the claws 71, therefore, back lash can hardly be caused between them. Thus, the pivot 75 can very smoothly slide along the claws 71, so that the axial force can be smoothly converted into a torque.

The following is a description of a valve open-close indicating apparatus according to the present embodiment. In the description herein, the position in the housing where the piston 31 is situated when the valve is closed is referred to as the close-side end portion (state of FIG. 1), the position where the piston is situated when the valve is open as the open-side end portion (state of FIG. 6), and the piston position between these two positions as the intermediate position, as mentioned before.

Basically, in this indicating apparatus, as shown in FIG. 1, an abutting portion 31f of the piston 31 abuts against a ring-shaped member 202 of the sleeve 38 to move the sleeve 38 to the close-side end portion, resisting the urging force of a cylindrical elastic member 220 at the close-side end portion, as the piston 31 approaches the close-side end portion. Thus, indicate switches (limit switches 81 and 82) can be caused to indicate "closed." When the piston 31 approaches the open-side end portion of the housing, as shown in FIG. 6, on the other hand, an abutting portion 31e of the piston 31 abuts against a ring-shaped member 201 of the sleeve 38 to move the sleeve 38 to the open-side end portion, resisting the urging force of a cylindrical elastic member 210 at the open-side end portion, thereby causing the limit switches 81 and 82 to indicate "open." When the piston 31 leaves the open- or close-side end portion, moreover, the sleeve 38 is restored to the intermediate position by means of the cylindrical elastic member 210 or 220 at the open- or close-side end portion, and the limit switches 81 and 82 indicate neither "open" nor "closed."

More specifically, the sleeve 38 first moves in the axial direction between the outer peripheral side of a cylindrical portion 33a on the cover member 33 and a recessed groove 34a of the first block 34. Accordingly, the pneumatic pressures of the first and second cylinder chambers A and B never act on the left- or right-hand end face of the sleeve 38.

The pair of ring-shaped members 201 and 202 are arranged at a predetermined distance from each other in the moving direction, on the inner peripheral surface of the sleeve 38. Further, a pair of annular projections 203 and 204 are arranged at a predetermined distance from each other in the moving direction, on the outer peripheral surface of the sleeve 38. The pair of cylindrical elastic members 210 and 220 are fixed individually to the opposite end portions of the outer periphery of the sleeve 38, at the open- and close-side end portions, respectively. The elastic members 210 and 220, which may be formed of springs, rubber, resin, etc., are adapted to abut against the pair of annular projections 203 and 204 of the sleeve 38, respectively, thereby urging the sleeve 38. Thus, the sleeve 38 is always urged to take the intermediate position, as shown in FIG. 5, unless the piston 31 engages the sleeve 38. While the sleeve 38 is moving to the right or left, or when it is situated in the intermediate position, as mentioned later, the cylindrical elastic members 210 and 220 engage stepped portions 205 and 206, respectively, which are formed on the inner wall of the cylinder 32.

A mechanism for turning on and off the limit switches 81 and 82 is provided including a hole 98 formed in the cylinder 32, two balls 96 and 97 set in the hole 98, and a recess 99 in the sleeve 38 into which the balls 96 and 97 can fall. The balls 96 and 97 are urged toward the recess 99 of the sleeve 38 by the limit switches 81 and 82.

Thus, when the sleeve 38 is moved to the right (valve-open to valve-closed), as shown in FIG. 1, the one ball 96 is lifted against the urging force of the switch 81 by the edge of the recess 99, to be fitted into the hole 98 of the cylinder 32. As a result, the limit switch 81 is turned on, so that the valve-closed state is indicated. When the sleeve 38 is moved to the left (valve-closed to valve-open), in contrast with this, the switches 81 and 82 are turned off and on, respectively, as shown in FIG. 6, so that the valve-open state is indicated.

The following is a description of the operation of the whole indicating apparatus.

When the piston 31 moves to the right (or to the close-side end portion), in closing the valve, as shown in FIG. 1, the abutting portion 31f of the piston 31 abuts against the ring-shaped member 202 of the sleeve 38, thereby moving the sleeve 38 to the close-side end portion against the urging force of the cylindrical elastic member 220 at the close-side end portion. Thereupon, the one ball 96 is lifted against the urging force of the switch 81 by the edge of the recess 99, to be fitted into the hole 98 of the cylinder 32. As a result, the limit switch 81 is turned on, so that the valve-closed state is indicated.

When the piston 31 then moves to the left, in the intermediate position where the valve shifts from the closed state to the open state, as shown in FIG. 5, the abutting portion 31f of the piston 31 is disengaged from the ring-shaped member 202. Thereupon, the cylindrical elastic member 220 presses the annular projection 204 of the sleeve 38, so that the sleeve 38 is moved to the left, thereby engaging the pair of stepped portions 205 and 206. In this state, the sleeve 38 is urged from both left- and right-hand sides by the urging members 210 and 220, as shown in FIG. 5. At this time, the ball 96 falls into the recess 99 to turn off the limit switch 81, so that the valve state is not indicated.

When the piston 31 moves to the left (or to the open-side end portion), in opening the valve, as shown in FIG. 6, the abutting portion 31e of the piston 31 abuts against the ring-shaped member 201 of the sleeve 38, thereby moving the sleeve 38 to the open-side end portion against the urging force of the cylindrical elastic member 210 at the open-side end portion. Thereupon, the other ball 97 is lifted against the urging force of the switch 82 by the edge of the recess 99, to be fitted into the hole 98 of the cylinder 32. As a result, the limit switch 82 is turned on, so that the valve-open state is indicated.

Thus, according to the present embodiment, the sleeve 38 is normally situated in the intermediated position by means of the pair of cylindrical elastic members 210 and 220, arranged at the open- and close-side end portions, and is moved as required by means of the force of the piston 31. Thus, the sleeve 38 is always in a stable state. Accordingly, the sleeve 38 can never be unexpectedly moved, and can be designed so that no pneumatic pressure acts on its end portion with a predetermined thickness. In consequence, the sleeve 38 is prevented from unexpectedly moving, so that the limit switches 81 and 82 are protected against wrong operation, and the reliability of the apparatus is improved. Further, the structure is so simple that assembling operation is easy.

The following is a description of a seal mechanism of the valve.

Since the valve according to the present embodiment is a vacuum valve, the inside of the housing 11 of the valve body 10 must be kept under vacuum. Meanwhile, the constant pressure P for driving the piston 31 is applied to the second cylinder chamber B of the valve open-close drive mechanism 30. Therefore, the inside of the housing 11 of the valve body 10 must be sealed so that the constant pressure P does not act inside the housing 11.

In the present embodiment, a bellows 103 is connected between an annular recess 111 in the cylindrical stationary member 37 and the piston block 43 fixed to the piston 31. As mentioned before, moreover, the O-ring 41 is interposed between the small-diameter portion 31b of the piston 31 and the first block 34.

If the O-ring 41 is not provided, the constant pressure P from the second cylinder chamber B acts between the piston block 43 and the stationary member 37 via the space between the small-diameter portion 31b of the piston 31 and the first and second blocks 34 and 35, thereby overweighting the bellows 103.

According to the present embodiment, the action of the constant pressure P from the second cylinder chamber B is prevented by means of the O-ring 41, so that the bellows 103 is free from burden.

In the conventional valve open-close drive mechanism, the torque for driving the valve plug acts on the bellows, so that the bellows sometimes may undergo deterioration, and can enjoy only a short life.

According to the present embodiment, in contrast with this, the axial force of the piston is converted into a torque by cooperation of the screw 50 and the pivot 75, whereby a loss attributable to conversion is restrained. Further, the screw 50 is supported on the cylindrical stationary member 37 for axial movement by means of the balls 55 which constitute the slide bearing. Accordingly, transmission of the torque of the pivot 75 to the bellows 103 is completely cut off, so that there is no possibility of any torque being applied to the bellows 103 at all. Thus, the bellows 103 is considerably restrained from undergoing deterioration, and can enjoy a prolonged life. Since the drive mechanism is reduced in size, moreover, the bellows 103 can be also reduced in size.

According to the present embodiment, furthermore, the space between the large-diameter portion 31a of the piston 31 and the sleeve 38 is sealed by means of the O-ring 39 on the outer peripheral surface of the piston 31, whereby air flow between the first and second cylinder chambers A and B is cut off.

It is to be understood that the present invention is not limited to the embodiment described above, and that various changes and modifications may be effected therein by one skilled in the art without departing from the scope or spirit of the invention. According to the embodiment, for example, the drive mechanism is a valve open-close drive mechanism which is applicable to a gate valve. Alternatively, however, the drive mechanism of the invention may be applied to the drive of the valve plug of various other valves, e.g., a butterfly valve.

According to the present invention, as described herein, the sleeve is normally restored to the intermediate position by the urging means, and is moved, as required, toward either of the opposite ends by means of the piston. Accordingly, the sleeve cannot move unexpectedly, and never fails to be moved when necessary. Following the reciprocation of the piston therefore, the sleeve can move securely, so that the indicating apparatus can display "open" or "closed" without fail. Thus, the possibility of wrong operation of the indicating apparatus is so little that the mechanism can enjoy high reliability. Including a relatively small number of components, moreover, the indicating apparatus has a simple structure, and is easy to assemble.

What is claimed is:

1. A valve open-close indicating apparatus for indicating an open or closed state of a valve, comprising:
   a cylindrical housing having two opposite ends in the axial direction thereof;
   a sleeve arranged in the housing for axial reciprocation between the opposite ends of the housing;
   urging means for urging the sleeve from both outer sides with respect to the axial direction so that the sleeve is normally situated in an intermediate position between the opposite ends;
   a piston arranged in the sleeve for axial reciprocation between the opposite ends of the housing, said piston being adapted to reciprocate between the opposite ends of the housing, thereby opening and closing the valve, so that the sleeve is pressed toward one end of the housing against the urging force of the urging means when the piston moves toward the one end to open the valve, and that the sleeve is pressed toward the other end against the urging force when the piston moves toward the other end to close the valve; and
   indicate means adapted to indicate "open" when the sleeve is pressed toward the one end, indicate "closed" when the sleeve is pressed toward the other end, and indicate nothing when the sleeve is restored to the intermediate position by means of the urging means without being pressed by the piston.

2. An indicating apparatus according to claim 1, wherein said sleeve has a pair of annular projections arranged at a predetermined distance from each other on the outer peripheral surface thereof, and said urging means includes a cylindrical elastic member for urging the pair of projections from both outer sides with respect to the axial direction.

3. An indicating apparatus according to claim 1, wherein said sleeve includes a pair of ring-shaped members arranged at a predetermined distance from each other on the inner peripheral surface thereof, and said piston includes at least one abutting portion arranged on the outer peripheral surface of the piston so as to be situated between the pair of ring-shaped members, with respect to the axial direction, and adapted to abut against the ring-shaped members, thereby pressing the same, when the piston reciprocates.

4. An indicating apparatus according to claim 1, wherein said sleeve has a recess in the outer peripheral surface thereof, and said display means includes two balls, situated i the recess and capable of projecting from the recess as the sleeve moves, and a display switch adapted to display "open" when one of the balls projects from the recess, and to display "closed" when the other ball projects from the recess.

* * * * *